J. STANLEY.
BUILDING LIGHT.
APPLICATION FILED JULY 25, 1911.

1,046,886.

Patented Dec. 10, 1912.

WITNESSES

INVENTOR
James Stanley
BY
ATTORNEYS

UNITED STATES PATENT OFFICE.

JAMES STANLEY, OF NEW YORK, N. Y.

BUILDING-LIGHT.

1,046,886.   Specification of Letters Patent.   Patented Dec. 10, 1912.

Application filed July 25, 1911. Serial No. 640,378.

*To all whom it may concern:*

Be it known that I, JAMES STANLEY, a citizen of the United States, and a resident of the city of New York, borough of the Bronx, in the county and State of New York, have invented a new and Improved Building-Light, of which the following is a full, clear, and exact description.

The object of the invention is to provide a new and improved building light for use on sidewalks, vault covers, area lights, sky lights and the like, and arranged to compensate for expansion and contraction, with a view to prevent breaking or cracking of the lenses.

For the purpose mentioned, use is made of a jacket or a sheath of cork, inclosing the lens at the peripheral face and leaving the top and bottom free for the refraction of the light.

A practical embodiment of the invention is represented in the accompanying drawings forming a part of this specification, in which similar characters of reference indicate corresponding parts in both views.

Figure 1:
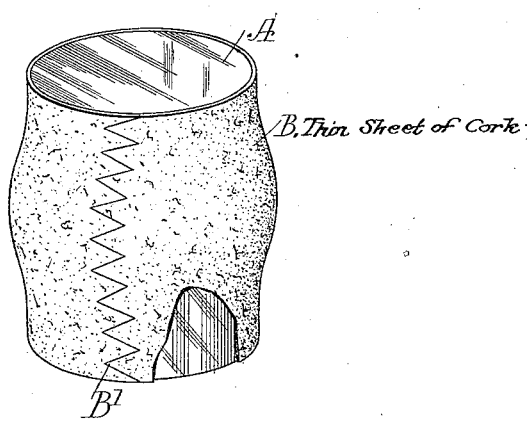
Figure 2:
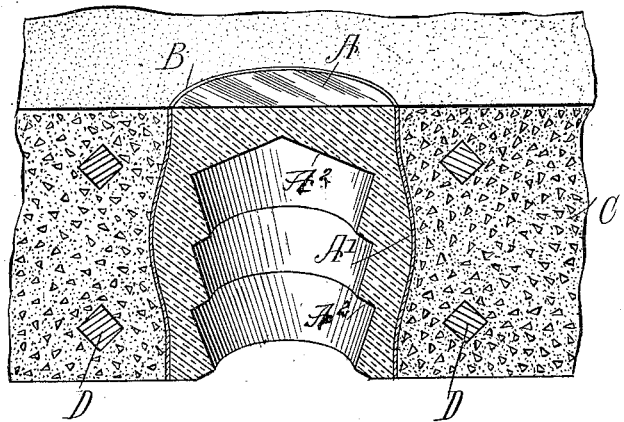

Figure 1 is a perspective view of a lens and its jacket of cork in position, part of the jacket being shown broken out; and Fig. 2 is a sectional perspective view of the building light and showing the lens and its jacket embedded in reinforced concrete.

The lens A is surrounded on its peripheral face by a jacket or sheath B, formed from a thin sheet of cork, having its meeting edges B' preferably serrated and interlocked, as plainly indicated in Fig. 1, and the said lens with its jacket B is embedded in concrete C, preferably provided with reinforcements D, or set in a suitable metallic frame or the like. The peripheral face of the lens A is provided at its middle with a swelled portion A' so that the lens A with its jacket is securely held in the plastic concrete material C, and in case pressure is applied to the top of the lens A the latter can yield at the lower half of the swelled portion A' owing to the jacket B being of cork, and forming a seat or cushion for the lens, without danger of the lens being cracked or pushed through the embedding material.

In practice, the sheet of cork is shaped to conform to the peripheral face of the lens A to form a close-fitting jacket or sheath for the lens. The inner surface of the jacket or sheath B of cork is preferably painted white, so as to insure a proper refraction of the light through the lens A, the under surface of which is made hollow and provided with refracting surfaces $A^2$, as plainly indicated in Fig. 2. In order to securely hold the jacket or sheath B in place on the lens A, it is preferably glued, pasted or cemented onto the peripheral face of the lens A.

It will be noticed that the lens with its jacket or sheath can be readily manufactured and held ready for use at any time, it being understood that the lens with its sheath or jacket forms an article of manufacture, in itself, which can be set in embedding material whenever desired. By having the sheath made of cork it is rendered exceedingly durable, that is, it is not liable to deteriorate by contact with the embedding material, and its resiliency is not impaired, and hence it readily compensates for any expansion or contraction in the building light and prevents breaking or cracking of the lens.

Building lights, as is well known, are subjected to severe strains by expansion and contraction, by mercantile traffic over the same and by the inclemency of the weather, notably moisture, and by using a close-fitting jacket of cork in preference to any other material the lenses are relieved of undue strains owing to the resilient quality of the cork, and moisture is not liable to enter or leak in or pass through the jacket and cause deterioration of the same. Cork has also the following additional advantages over other materials heretofore employed for setting lenses: It is resilient and takes up the expansion and contraction caused by changes in the temperature in the solid materials surrounding it and prevents the fracturing of the lens; it is a non-conductor of heat; it is a non-conductor of sound and gives to a pavement when used a lack of noise so common in ordinary pavements; it does not deteriorate like putties used in setting lenses, as when these substances evaporate, they become useless; it is not affected by acids or alkalies; it is not affected by temperature; it is in a sense waterproof, but expands slightly by application of water which is beneficial in this specific purpose; and being softer material than that which it surrounds it wears faster and leaves the surface of the pavement serrated, giving a firmer foot hold and an anti-slipping surface.

Having thus described my invention, I claim as new and desire to secure by Letters Patent:

1. As a new article of manufacture a building light, comprising a lens, and a jacket formed of a sheet of cork inclosing the lens at the side and leaving the top and bottom of the lens free for the refraction of the light.

2. A building light, comprising a lens provided at its peripheral face with a swelled middle portion, and a jacket of cork surrounding the peripheral face.

3. A building light, comprising a lens provided at its peripheral face with a swelled middle portion, and a jacket formed of a thin sheet of cork surrounding the peripheral face of the lens and having its meeting edges united.

4. A building light, comprising a lens provided at its peripheral face with a swelled middle portion, and a jacket formed of a thin sheet of cork surrounding the peripheral face of the lens and having its meeting edges serrated and interlocked.

5. As a new article of manufacture a building light, comprising a lens having in its under face a cavity, the wall of which is of irregular form, forming refracting surfaces, and a cork jacket having its inner surface painted white and surrounding the peripheral face of the lens.

6. A building light, comprising a lens provided at its peripheral face with a swelled middle portion, a jacket of cork surrounding the peripheral face, and a plastic material in which the said lens and its jacket are embedded.

In testimony whereof I have signed my name to this specification in the presence of two subscribing witnesses.

JAMES STANLEY.

Witnesses:
 THEO. G. HOSTER,
 PHILIP D. ROLLHAUS.

Copies of this patent may be obtained for five cents each, by addressing the "Commissioner of Patents, Washington, D. C."